US009857194B2

(12) United States Patent
Vecera et al.

(10) Patent No.: US 9,857,194 B2
(45) Date of Patent: Jan. 2, 2018

(54) TIME RELATED POINTS OF INTEREST FOR NAVIGATION SYSTEM

(71) Applicant: Red Hat, Inc., Raleigh, NC (US)

(72) Inventors: Martin Vecera, Brno (CZ); Jiri Pechanec, Mokra-Horakov (CZ)

(73) Assignee: RED HAT, INC., Raleigh, NC (US)

( * ) Notice: Subject to any disclaimer, the term of this patent is extended or adjusted under 35 U.S.C. 154(b) by 56 days.

(21) Appl. No.: 14/567,622

(22) Filed: Dec. 11, 2014

(65) Prior Publication Data

US 2016/0169697 A1 Jun. 16, 2016

(51) Int. Cl.
*G01C 21/36* (2006.01)

(52) U.S. Cl.
CPC ................. *G01C 21/3679* (2013.01)

(58) Field of Classification Search
None
See application file for complete search history.

(56) References Cited

U.S. PATENT DOCUMENTS

| | | | | |
|---|---|---|---|---|
| 5,948,040 A * | 9/1999 | DeLorme | ............... | G01C 21/36 340/990 |
| 6,401,034 B1 * | 6/2002 | Kaplan | ............... | G01C 21/3682 340/988 |
| 7,480,566 B2 | 1/2009 | Laverty | | |
| 7,826,965 B2 * | 11/2010 | Sadri | ...................... | G01C 21/20 340/905 |
| 8,014,939 B2 | 9/2011 | Sheha et al. | | |
| 8,682,576 B2 | 3/2014 | Kurtti et al. | | |
| 9,008,888 B1 * | 4/2015 | Gravino | ............. | G01C 21/3476 701/26 |
| 2007/0050128 A1 * | 3/2007 | Lee | ..................... | G01C 21/3611 701/532 |
| 2009/0150067 A1 * | 6/2009 | Lindman | ............ | G01C 21/3476 701/465 |
| 2009/0228196 A1 * | 9/2009 | Raab | ..................... | G01C 21/26 701/532 |
| 2010/0088018 A1 * | 4/2010 | Tsurutome | ......... | G01C 21/3682 701/533 |
| 2010/0094550 A1 | 4/2010 | Tsurutome et al. | | |
| 2010/0161215 A1 | 6/2010 | Karani | | |
| 2010/0268463 A1 * | 10/2010 | Kurtti | ................ | G01C 21/3679 701/469 |

(Continued)

OTHER PUBLICATIONS

POI Loader, http://www.garmin.com/us/maps/poiloader.

*Primary Examiner* — Truc M Do
(74) *Attorney, Agent, or Firm* — Haynes and Boone, LLP (57) ABSTRACT

A method performed by a computing system includes, with the computing system, providing a user with directions from a current location of the user to a destination, searching a database for a set of points of interest within a predefined distance from a route between the current location and the destination, the searching accounting for a deviation time value associated with each point of interest and a user received allotted time value, the allotted time value indicating a total amount of time the user has allotted for deviation from the route, the deviation time value indicating an estimated amount of time it takes to visit a corresponding point of interest, and presenting to the user, at least one point of interest with the corresponding visitation time value being less than the time deviation value.

19 Claims, 5 Drawing Sheets

(56) References Cited

U.S. PATENT DOCUMENTS

| | | | |
|---|---|---|---|
| 2011/0106429 A1* | 5/2011 | Poppen | G01C 21/3476 701/533 |
| 2012/0209506 A1* | 8/2012 | Tamayama | G01C 21/343 701/410 |
| 2012/0303272 A1* | 11/2012 | Studzinski | G01C 21/32 701/450 |
| 2013/0060462 A1* | 3/2013 | Hansen | G01C 21/3476 701/424 |
| 2014/0095063 A1 | 4/2014 | Saraswat | |

* cited by examiner

| Name | Type | Time |
|---|---|---|
| Point A | Restaurant | 45 minutes |
| Point B | Museum | 2 hours |
| Point C | Historical Point | 3 hours |
| Point D | Restaurant | 1 hour |
| Point E | Entertainment | 2.5 hours |

306 · 308 · 310

302

| Route Deviation | Total Time |
|---|---|
| 20 minutes | 65 minutes |
| 1 hour | 3 hours |
| 30 minutes | 3.5 hours |
| 1 hour | 2 hours |
| 15 minutes | 2.75 hours |

TIME RELATED POINTS OF INTEREST FOR NAVIGATION SYSTEM

BACKGROUND

The present disclosure relates generally to navigation systems, and more particularly to methods and systems for providing a user with points of interest in a navigation system.

People often use navigation systems to help them find their way around. Typically, a user enters a destination into his or her navigation system and the system provides the user guidance on how to get there. The guidance may be verbal, graphical, or both. Specifically, the guidance may be a computerized voice that tells the user where to turn as he or she travels towards the destination. The guidance may also display a map that includes a layover of the user's route. The navigation system may use a variety of location services, such as a Global Positioning System (GPS) to determine the user's current location and guide the user from there. Navigation systems often include a variety of features that improve the experience of using the navigation system. It is desirable to find ways to improve the functionality of such navigation devices.

SUMMARY

A method performed by a computing system having navigation capability includes receiving location information associated with a current location of a user, with the computing system, determining a route between the current location and a destination, with the computing system, providing a user with navigation along the route, with the computing system, receiving from the user, an allotted time value, searching a database comprising a plurality of entries, each entry comprising a point of interest and a visitation time value associated with that point of interest, calculating a deviation time value based on the visitation time value for one or more of the plurality of entries, determining a set of points of interest, each point of interest in the set being associated with a deviation time value that is less than the allotted time value, and with the computing system, presenting a point of interest from the set to the user.

A method performed by a computing system includes, with the computing system, providing a user with directions from a current location of the user to a destination, searching a database for a set of points of interest within a predefined distance from a route between the current location and the destination, the searching accounting for a deviation time value associated with each point of interest and a user received allotted time value, the allotted time value indicating a total amount of time the user has allotted for deviation from the route, the deviation time value indicating an estimated amount of time it takes to visit a corresponding point of interest, and presenting to the user, at least one point of interest with the corresponding visitation time value being less than the time deviation value.

A computer program product stored on a non-transitory computer readable medium, the computer program product comprising machine readable instructions that when executed by a processor of a computing system, cause the system to determine a current location of a user, determine a route between the current location and a destination, provide a user with navigation along the route, receive from the user, an allotted time value, search a database comprising a plurality of entries, each entry comprising a point of interest and a visitation time value associated with that point of interest, calculate a deviation time value based on the visitation time value for each of the plurality of entries, determine a set of points of interest, each point of interest in the set being associated with a deviation time value that is less than the allotted time value, and present a point of interest from the set to the user.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to find ways to improve the functionality of navigation systems. According to principles described herein, a user may provide a navigation system with a set amount of time in which the user is willing to deviate from his or her route. For purposes of discussion, this will be referred to as an allotted time value. For example, a user may set up a route from his or her current location to a destination that is four hours away. But, the user may have an additional three hours for which he or she is willing to stop along the way. The navigation system can then search for points of interest along the route. The points of interest may be filtered based on user preferences. Each point of interest may be associated with an amount of time it takes to visit that point of interest. The amount of time includes both the time it takes to deviate from the user's current route and the estimated amount of time that is spent at the point of interest. If a given point of interest along the user's route can be visited in an amount of time that is less than the user defined allotted time value, than that point of interest may be presented to the user.

Figure 1:
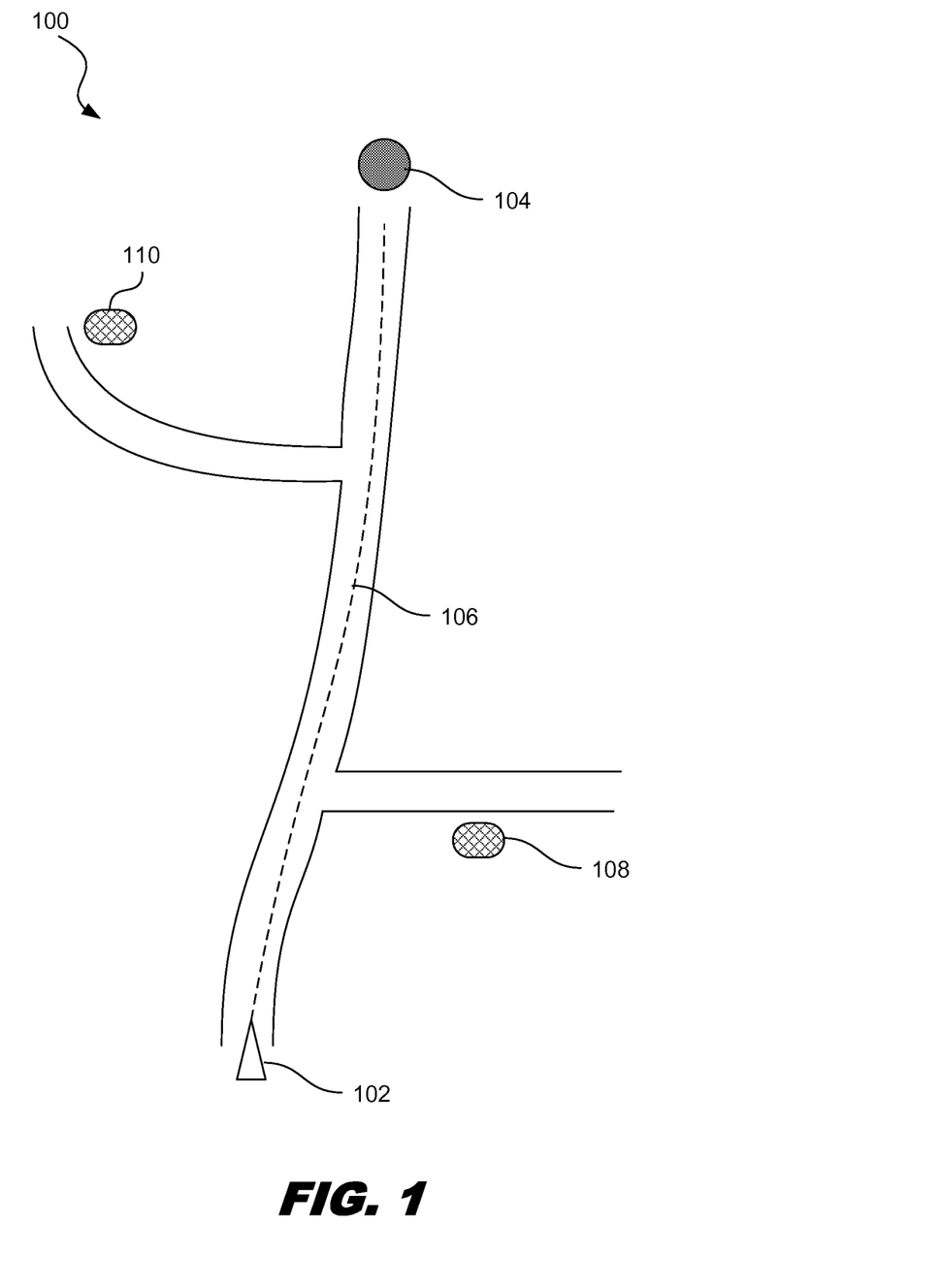
FIG. 1 is a diagram showing an illustrative route with points of interest near the route, according to one example of principles described herein.

FIG. 1 is a diagram showing an illustrative route 106 with points of interest 108, 110 near the route 106. According to the present example, a navigation system provides a user with navigation guidance along a route 106 from the user's current location 102 to a destination 104. Along the route 106, there are points of interest 108, 110, in which the user is potentially interested.

The navigation system uses principles described herein to determine whether the points of interest 108, 110 should be presented to the user. Specifically, the navigation system will consider the allotted time value, which is the amount of time the user has indicated that he or she is willing to deviate from the route 106. Additionally, the navigation system considers the total deviation time for each point of interest 108, 110. The total deviation time includes the time spent traveling away from the route 106. This will be referred to as travel deviation time. For example, it may take 30 minutes of travel away from the route 106 to reach a point of interest. Thus, it will also take 30 minutes to travel back to the route 106, leading to a total travel deviation time of one hour. Additionally, the total deviation time includes the amount of time spent at a point of interest. This amount of time will be referred to as the visitation time. Thus, total deviation time for a point of interest is travel deviation time plus visitation time.

In one scenario, the user enters the destination 104 into his or her navigation system. Based on a variety of factors, the navigation system estimates that it will take the user five hours to travel the route 106. Additionally, the user indicates to the navigation system that he or she has an additional three hours that he or she is willing to spend deviating from the route 106. Thus, the allotted time in this scenario is three hours. The navigation system determines that there is a first point of interest 108 somewhat near the route 106. In this scenario, the first point of interest 108 has a total deviation time of four hours. This total deviation time includes a travel deviation time of two hours and a visitation time of two hours. Because the total deviation time is greater than the allotted time, the navigation system determines that the first point of interest 108 should not be presented to the user.

As the user continues along the route 106, the navigation system detects a second point of interest 110 somewhat near the route 106. In this scenario, the second point of interest has a travel deviation time of two hours and a visitation time of 30 minutes. Thus, the total deviation time is two and a half hours. Because the total deviation time is less than the allotted time, the navigation system can present the second point of interest 110 to the user. If the user wishes to visit this second point of interest 110, then the navigation system can reroute the user to that point of interest.

In one example, both points of interest 108, 110 may have total time deviation values that are less than the allotted time. But, the user may only have time to visit one of the points of interest. For example, if the user decides to visit the first point of interest, the navigation system will not present the second point of interest 110 because the user will no longer have time to visit the second. If, however, the user declines to visit the first point of interest 108, then the navigation system may present the second point of interest 110 to the user. The user may then choose to accept or decline the prompt to visit the second point of interest 110.

In one scenario, a user may have enough time to visit both points of interest 108, 110. For example, a user may set an allotted time of 5 hours. The first point of interest may represent a total deviation time of two hours and the second point of interest 110 may represent a total deviation time of three hours. If the user accepts the prompt to deviate to the first point of interest 108, the navigation system can update the allotted time based on the actual amount of time the user spends deviating from the route 106. For example, even though it was an estimated two hours for the first point of interest, it may be the case that the user visited the first point of interest in one and a half hours. The allotted time can be updated by subtracting the actual deviation time from the allotted time. The updated allotted time would thus be five hours minus one and a half hours, which would be three and a half hours. Because the second point of interest 110 has a deviation time of three hours in this scenario, the navigation system can also present the second point of interest 110 to the user.

The allotted time can be provided by the user to the navigation system in a variety of manners. In one example, the user may provide the allotted time when he or she enters the destination. In some examples, the user may set a default allotted time. For example, the user may have a default allotted time of two hours. But, the user may have the option of overriding the default allotted time when the user enters a destination into the navigation system.

The travel deviation time may be estimated in a variety of manners. For example, the navigation system can utilize a variety of known factors to calculate an estimated time it will take to travel off the current route, and back onto the current route. In some cases, after traveling off the route to reach a point of interest, the most efficient way from the point of interest to the original destination may be different than the path the user took to deviate from the route. Thus, the travel deviation time can be calculated as the total difference in time it will take if the user travels to a particular point of interest.

The known factors may include the known speed limits of the roads along a particular route. The navigation system may also utilize traffic data to more accurately estimate a travel time. The navigation system may also use data accumulated from multiple travelers to determine the average amount of time it takes to travel a particular route. Such factors can all be used to provide an estimated travel deviation time that is used to determine whether the user has time to visit a particular point of interest.

The estimated visitation time may be determined from a variety of factors. For example, if the point of interest is a museum or a historical point, there may be some type of public information that estimates how long it takes visitors to tour the museum or historical point. For example, a website for a particular museum may indicate that visitor's should plan on two hours to tour the museum. If the point of interest is a restaurant, then the estimated visitation time may be based on the type of restaurant. Other factors may be used to determine an estimated visitation time. For example, the navigation system may have access to data collected from multiple users indicating how long they spent at a particular place. The estimated visitation time may thus be an average amount of time spent by users at that place.

Figure 2:
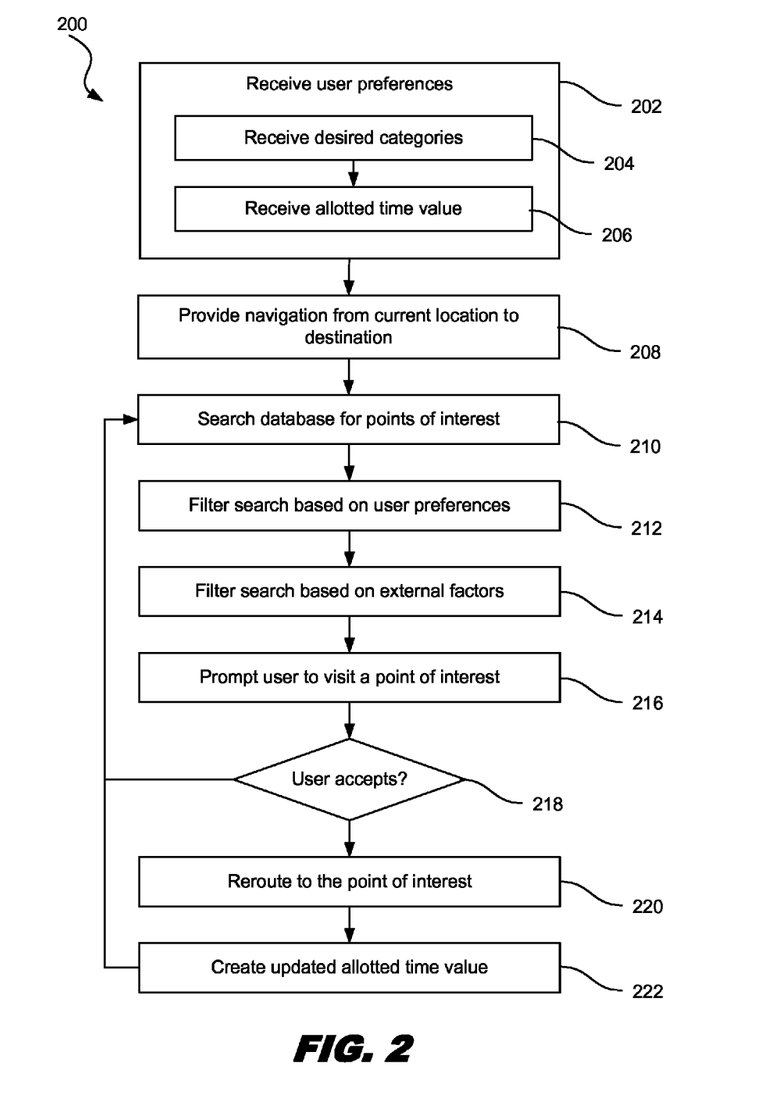
FIG. 2 is a flowchart showing an illustrative method for providing a user with points of interest through a navigation system, according to one example of principles described herein.

FIG. 2 is a flowchart showing an illustrative method 200 for providing a user with points of interest through a navigation system. According to the present example, the method 200 includes a step 202 for receiving user preferences. Step 202 may include a step 204 for receiving a set of desired categories and a step 206 for receiving the allotted time value.

The navigation system may provide the user with a set of categories for different types of points of interest. For example, one category may be restaurants and another category may be museums, etc. In some examples, there may be sub-categories such as types of restaurants. The user may select a set of categories in which he or she is interested. The points of interest along the current route may be grouped into categories. But, only categories in which the user is interested can be displayed to the user.

As described above, the allotted time value indicates how much time the user is willing to deviate from his or her current route. The allotted time may be set each time a user enters a destination for navigation. In some cases, the user may have an allotted time of zero, meaning that he or she does not wish to deviate from the route.

According to the present example, the method 200 further includes a step 208 for providing navigation from the user's current location to a destination. The destination can also be provided by the user. The navigation system may utilize location systems such as a GPS to determine the user's current location. The navigation system can use digital forms of maps and compare them with the user's current location in order to provide turn-by-turn navigation.

According to the present example, the method 200 further includes a step 210 for searching a database for points of interest. In one example, the database is stored locally on the user's device. In one example, the database is stored on one or more servers that are accessible by the user's device over, for example, a wi-fi connection, a 3G connection, a 4G connection, or through another wireless communication technology. The database can be filtered based on the user's current route.

According to the present example, the method 200 further includes a step 212 for filtering the search based on user preferences. For example, if the user has indicated that he or she is only interested in a set of specific categories, then points of interest not in those categories will be filtered out. Additionally, the search will be filtered based on the allotted time the user has provided. As described above, each point of interest is associated with a total deviation time. The total deviation time includes travel deviation time and visitation time. If the sum of the travel deviation time and the visitation time for a particular point of interest is greater than the allotted time, then that particular point of interest will be filtered out. This is because the user does not have enough time to visit that point of interest.

According to the present example, the method 200 further includes a step 214 for filtering the search based on external factors. A variety of external factors may affect the search. For example, if a particular point of interest is currently closed, then that point of interest may be filtered out. The database that includes the point of interest may include information about the operating hours of a particular point of interest, thus the operating hours can be compared to the current time of day to determine whether the point of interest is currently open. If a particular point of interest is not open then it can be filtered out because the user is unable to visit it anyway. Additionally, if the point of interest would close by the time the user arrived at the point of interest, then it may be filtered out as well.

In some examples, the search may be filtered based on the time of day. For example, if it is not during a meal time, then food related points of interest can be filtered out. Conversely, if it is during a meal time, then non-food related points of interest can be filtered out. Meal times may be defined by the user. For example, the user may have a preference for meal times and provide such preferences to the navigation system. Additionally or alternatively, there may be default meal times that the user is able to change.

The method 200 further includes a step 216 for prompting the user to visit a particular point of interest. If the search, after being filtered, includes more than one point of interest, then the point of interest that is currently closest to the user may be provided first. The user can then be presented with a prompt that asks if the user wishes to visit the point of interest. The steps of searching, filtering, and presenting results to a user can be performed periodically. For example, every ten minutes, the navigation system may do another search for nearby points of interest. If no points of interest remain after being filtered, then no presentation is made to the user.

The method 200 further includes a step for determining 218 whether the user accepts the prompt to visit the point of interest. If not, then the method returns to step 210. In some examples, a period of time will pass before the navigation system starts another search. In some examples, if the user does not accept the prompt to visit a point of interest, and there are more points of interest to be presented, then the system will present the next point of interest to the user. If the user accepts a prompt to visit a point of interest, then the method 200 proceeds to step 220, at which the navigation system reroutes the user to the accepted point of interest.

In some examples, the method 200 includes a step 222 for updating the allotted time value after the user deviates from his or her route. The updated allotted value is equal to the original allotted value minus any amount of time spent deviating from the route. For example, if the original allotted time was three hours, and the user deviates from the route for one hour, then the updated allotted time is two hours. Then, the method 200 can return to step 210 to search for additional points of interest. Then, at step 212 when the search is filtered, the updated allotted time will be used.

Figure 3:
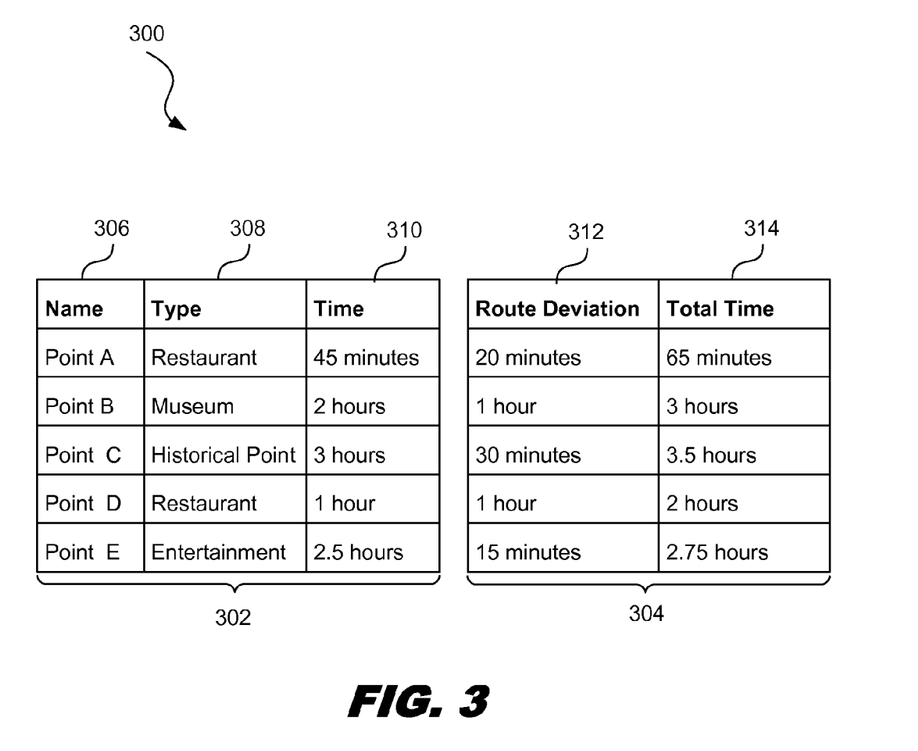
FIG. 3 is a diagram showing illustrative database for point of interest entries, according to one example of principles described herein.

FIG. 3 is a diagram showing illustrative database for point of interest entries. According to the present example, the database 300 includes a static portion 302 and a dynamic portion 304. The static portion 302 includes data that is generally set, but may be updated on a periodic basis. The dynamic portion 304 includes data that is calculated based on a user's current position. In one example, the static portion 302 is stored on a remote server while the dynamic portion is stored locally on the user's device. Each row within the database 300 corresponds to an entry.

The static portion includes a name column 306, a type column 308, and a visitation time column 306. The name column 306 includes the name of a point of interest for the respective entry. The type column 308 includes the category in which the corresponding point of interest has been placed. For example, point A has been placed within the restaurant category.

The visitation time column includes the estimated visitation time for the corresponding point of interest. For example, point A has a visitation time of 45 minutes. This means that it is estimated that the user will spend 45 minutes at this restaurant. As described above, this estimation may be done through a variety of methods. In one example, the estimation may be based on the type of restaurant. In one example, the estimation may be based on data collected on how much time other users have spent at the restaurant.

The dynamic portion 304 includes a route deviation time column 312 and a total time column 314. The route deviation column 312 indicates the amount of time it will add to the user's route if the user were to visit the corresponding point of interest. Thus, the route deviation time is based on the user's current location as well as the location of the point of interest and the destination of the user's current route. The route deviation time may be updated periodically, for example, every minute. As the user travels, the route deviation time will change.

The total time column 314 indicates the sum of the route deviation time and the visitation time. The total time thus represents the total amount of time a user will spend to visit, and fully experience, a particular point of interest. This is the value that can be compared with the user's allotted time to determine whether this point of interest should be presented to the user.

Figure 4:
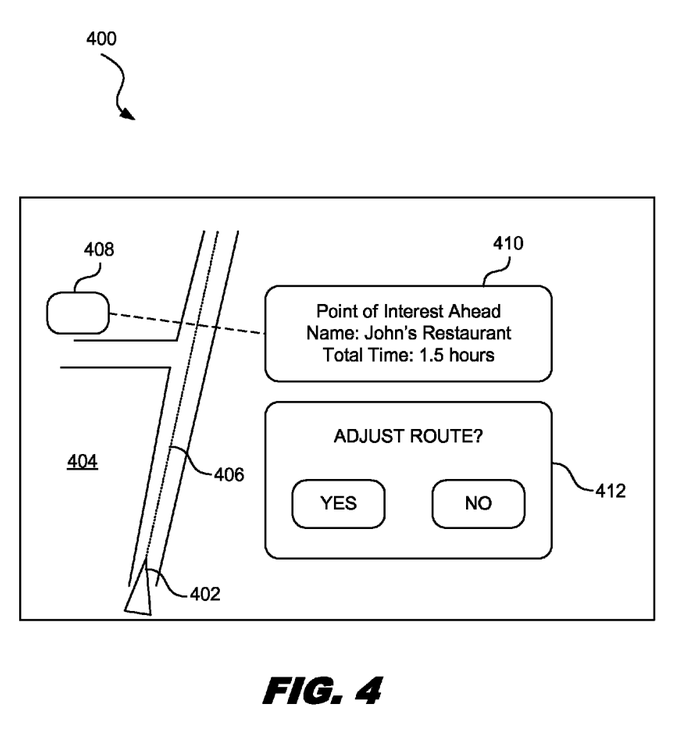
FIG. 4 is a diagram showing an illustrative graphical user interface for a navigation system that presents points of interest to the user, according to one example of principles described herein.

FIG. 4 is a diagram showing an illustrative graphical user interface for a navigation system that presents points of interest to the user. According to the present example, the graphical user interface 400 may be associated with a navigation system. The navigation system may be a dedicated device that is either integrated with the vehicle or placed within the vehicle. The navigation system may also be an application of another device such as a mobile phone.

The graphical user interface 400 displays the user's current location 402 as well as a map 404 of the area around the user's location 402. The graphical user interface 400 also displays the user's current route. In some examples, the graphical user interface 408 will graphically display a point of interest 408. The point of interest 408 may be represented as an icon that may vary based on the type of point of interest 408. If the point of interest 408 is one that is to be presented to the user after the filtering steps described above, then basic information 410 may be presented to the user. The basic information 410 includes the name of the point of interest, and the total deviation time associated with the point of interest. In some examples, the basic information includes a brief summary of the point of interest 408 or a brief description of the point of interest 408.

The graphical user interface 400 also displays a prompt 412 that asks the user if he or she wishes to visit the point of interest 408. The user may then select "yes" or "no" according to the user's preference. If the user selects "yes," then the navigation system will reroute the user to the point of interest 408. Otherwise, the navigation system will keep directing the user along the current route 406.

Figure 5:
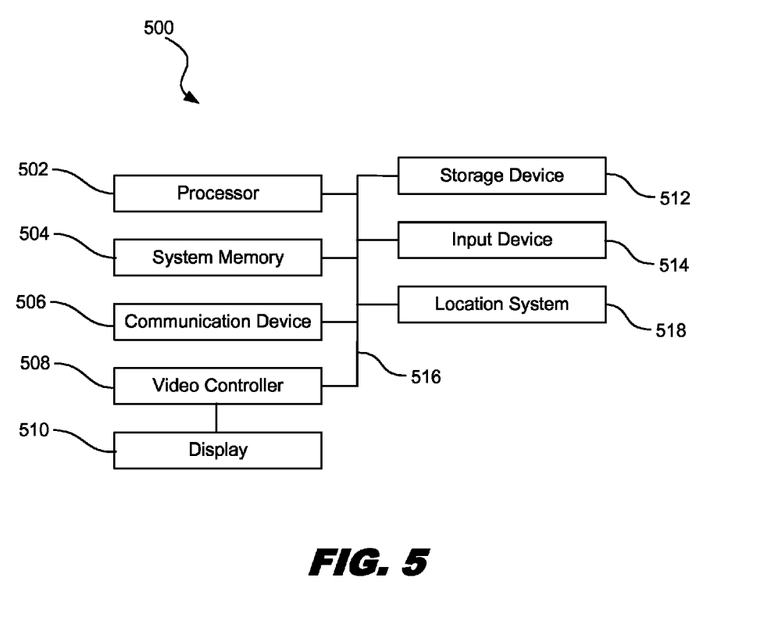
FIG. 5 is diagram showing an illustrative computing system that can be used for navigation systems that present points of interest, according to one example of principles described herein.

FIG. 5 is diagram showing an illustrative computing system that can be used for as a navigation system that provides points of interest to a user. According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

The computing system 500 also includes a location system 518. The location system 518 identifies the current location of the computing system 500 and also presumably its user. The location system 518 may be a GPS system or other location technology. The location system may be configured to provide the computing system with location information, such as latitude, longitude, altitude, etc. of a device.

Some examples of processing systems described herein may include non-transitory, tangible, machine readable media that include executable code that when run by one or more processors (e.g., processor 502) may cause the one or more processors to perform the processes of method 200 as described above. Some common forms of machine readable media that may include the processes of method 200 for example, floppy disk, flexible disk, hard disk, magnetic tape, any other magnetic medium, an optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system having navigation capability, the method comprising:
   receiving location information associated with a current location of a user;
   with the computing system, determining a route between the current location and a destination;
   with the computing system, providing a user with navigation along the route;
   with the computing system, receiving from the user, an allotted time value;
   searching a database comprising a plurality of entries, each entry comprising a point of interest and a visitation time value associated with that point of interest, the visitation time value based on data indicating an average amount of time other users have spent at the point of interest;
   calculating a deviation time value based on the visitation time value for one or more of the plurality of entries;
   determining a set of points of interest, each point of interest in the set being associated with a deviation time value that is less than the allotted time value;
   filtering out non-food related points of interest from the set if the current time of day corresponds to meal times; and
   with the computing system, presenting a point of interest from the set to the user.

2. The method of claim 1, wherein the deviation time value is further based, at least in part, on a travel time value, the travel time value being an estimated amount of time it would take to deviate from the route to visit the point of interest.

3. The method of claim 2, wherein the deviation time value is based on a sum of the travel time and the visitation time value.

4. The method of claim 3, wherein the visitation time is an estimated time based on an average amount of time spent by previous users.

5. The method of claim 1, further comprising, filtering the set of points of interest based on a current time of day.

6. The method of claim 5, further comprising, removing points of interest from the set that have operating hours that do not allow a full visit based on the current time of day.

7. The method of claim 5, further comprising filtering out points of interest based on categories selected by the user.

8. The method of claim 1, further comprising:
   selecting a point of interest from the set that is closest to the current location;
   presenting a summary of the selected point of interest to the user; and
   prompting the user for an approval to navigate to the point of interest.

9. The method of claim 8, further comprising, adjusting the route to visit the selected point of interest in response to receiving user approval.

10. A method performed by a computing system, the method comprising:
    with the computing system, providing a user with directions from a current location of the user to a destination;
    with the computing system, searching a database for a set of points of interest within a predefined distance from a route between the current location and the destination, the searching accounting for a deviation time value associated with each point of interest and a user received allotted time value, the allotted time value indicating a total amount of time the user has allotted for deviation from the route, the deviation time value indicating an estimated amount of time it takes to visit a corresponding point of interest, the estimated amount of time being based on data indicating an average amount of time other users have spent at the point of interest;
    with the computer system, filtering out non-food related points of interest from the set if the current time of day corresponds to meal times; and
    with the computing system, presenting to the user, at least one point of interest with the corresponding deviation time value being less than the time deviation value.

11. The method of claim 10, wherein the deviation time value is based in part on a difference between a total time associated with the route between the current location and the destination, and a total time associated with a revised route between the current location and the destination, the revised route passing through the point of interest corresponding to the deviation time value.

12. The method of claim 10, wherein the deviation time value is based in part on an estimated time to be spent at the corresponding point of interest.

13. The method of claim 10, wherein the database comprises an entry for each of the points of interest, each point of interest being associated with data that includes at least one of: hours of operation, a summary of the point of interest, or an expected amount of time to experience the point of interest.

14. The method of claim 10, further comprising, prompting a user to visit the closest point of interest having a deviation time value less than the allotted time value.

15. The method of claim 10, further comprising, updating the allotted time value to create an updated allotted time value, the updated allotted time value based on an amount of time the user spends deviating from the route.

16. The method of claim 10, further comprising, searching the database while taking into account deviation time values of the points of interest and the updated allotted time value.

17. A computer program product stored on a non-transitory computer readable medium, the computer program product comprising machine readable instructions that when executed by a processor of a computing system, cause the system to:
   determine a current location of a user;
   determine a route between the current location and a destination;
   provide a user with navigation along the route;
   receive from the user, an allotted time value;
   search a database comprising a plurality of entries, each entry comprising a point of interest and a visitation time value associated with that point of interest, the visitation time value based on data indicating an average amount of time other users have spent at the point of interest;
   calculate a deviation time value based on the visitation time value for each of the plurality of entries;
   determine a set of points of interest, each point of interest in the set being associated with a deviation time value that is less than the allotted time value;
   filter out non-food related points of interest from the set if the current time of day corresponds to meal times; and
   present a point of interest from the set to the user.

18. The computer program product of claim 17, wherein the deviation time value is based on a sum of an amount of time associated with deviating from the route to visit the point of interest and an estimated time to be spent at the point of interest.

19. The computer program product of claim 17, wherein to search the database, the machine readable instructions cause the system to account for a current time of day.

* * * * *